May 28, 1929.  T. G. HITT  1,714,671
ROTARY ROCKET
Filed May 4, 1928

Inventor
Thomas G. Hitt
By Mason Fenwick & Lawrence
Attorneys

Patented May 28, 1929.

UNITED STATES PATENT OFFICE.

THOMAS G. HITT, OF SEATTLE, WASHINGTON.

ROTARY ROCKET.

Application filed May 4, 1928. Serial No. 275,171.

This invention relates to improvements in rotary rockets, particularly of the balanced type, having compartments for holding display matter suitable for pyrotechnic exhibitions.

An object of this invention is to provide an arenic rotary rocket having as balancing members oppositely extending containers for holding the pellets of composition required for display purposes.

Another object of this invention is to provide a rotary rocket of the balanced type, simple of construction and inexpensive of manufacture.

A further object of this invention is to provide a rotary balanced rocket in which the display elements are caused to function at an elevation suitable for grandstand display purposes, it being a common complaint that pyrotechnic displays at high elevations can not be readily observed from grandstand seats.

A further object of this invention is to provide a rotary rocket in which the chambers for holding the display pellets are used as balancing members, pyrotechnic display being thrown from the containers at the desired time by means of centrifugal force, thereby adding materially to the display effects.

Other objects of this invention will appear from the following detailed description of the device, and as disclosed in the single sheet of drawings which is herewith made a part of this application.

In the drawings—

Figure 1:
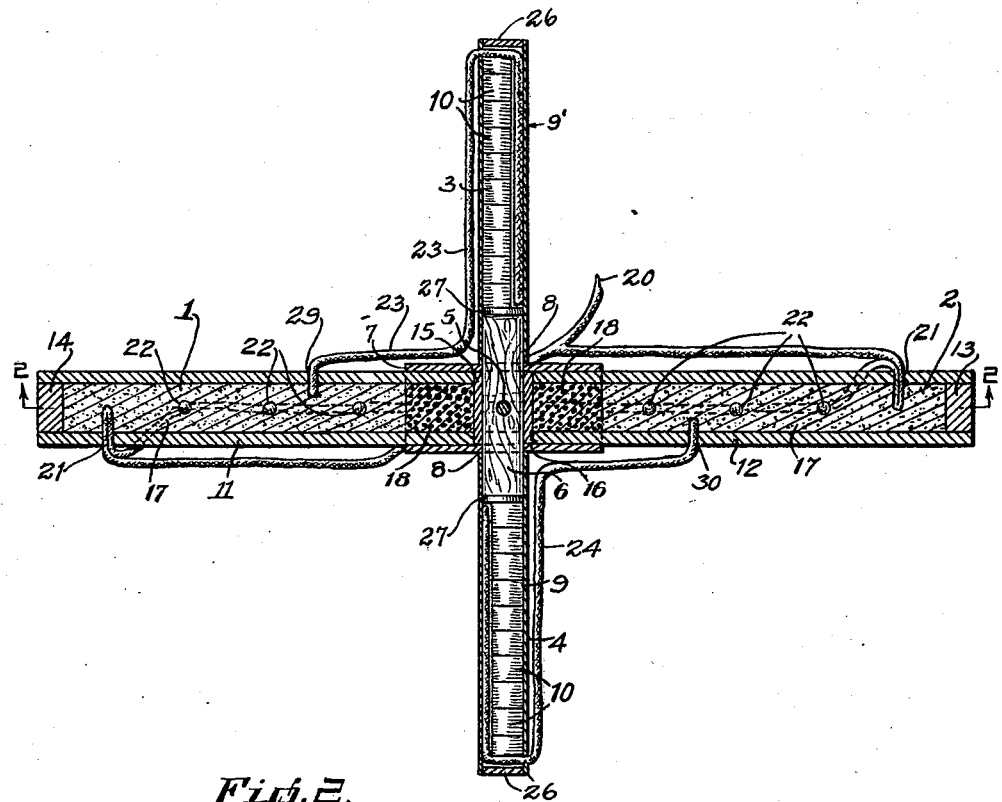
Fig. 1 illustrates a sectional plan view of the rotary balanced rocket.

In the rotary balanced rocket, according to this invention, it is preferred that numerals 1 and 2 designate containers of any desired dimensions and shape, for instance, of tubular form, and adapted to receive a suitable slow burning composition.

Numerals 3 and 4 designate containers adapted to detachably receive pyrotechnic display elements. The members 1, 2, 3, and 4 are preferably arranged horizontally in the form of a cross, or the various chambers may be arranged in other forms in the event of more than four containers being used, so that the device as a whole may be loosely and detachably balanced at the center about a pivot member 5.

The inner ends of the containers or chamber portions 1 and 2 are adapted to approximately contact with a dowel member 6, made of wood or any other suitable material, and having extending therethrough the pivot member 5 for rotatably mounting the rocket. In the rotary balanced rocket, according to this invention, the chambers 1 and 2 are adapted as horizontal lifting members, while the pyrotechnic display chambers 3 and 4 function to act as horizontal balancing members as the rocket rises.

In order to hold the chamber portions in firm and operative relationship with each other, a central holding frame or hub 7, made of any suitable material such as heavy paper or the like, is provided, and extends a desired distance over the inner ends of the horizontal lifting members 1 and 2, as clearly disclosed in the figures of drawings, the central holding frame 7 being provided with openings 8, through which the wooden dowel element 6 is adapted to extend.

The wall portions 9 and 9' for the horizontal balancing members 3 and 4, may be made of any desirable material such as paper, and of such a nature that at the proper time the stars, flags, or other pyrotechnic display elements may be thrown from the balancing members 3 and 4 by virtue of centrifugal force, the pyrotechnic display elements or pellets being designated in Figure 1 by numerals 10.

In this invention, the pellets 10, consisting of colored stars or the like, are hurled from the containers by centrifugal motion instead of by bursting powder, thereby giving a unique effect to the display.

The horizontal lifting members 1 and 2 consist of outer wall portions 11 and 12, and outer end plug elements 13 and 14, and inner end closing elements 15 and 16. The chambers 1 and 2 are adapted to contain a slow burning composition 17, consisting of meal powder or otherwise, the destroying explosive 18 being located at the inner ends of the chambers 1 and 2, and held in compressed position therein. The composition 17 and explosive 18 being packed closely together so as to maintain their proper relative positions within the containers 1 and 2 previous to ignition.

The chambers 3 and 4, as disclosed in Figure 1, are arranged in fixed right angle relationship to the lifting members 1 and 2, and are constructed in such a manner that when the rocket has reached its approximate highest point the pellets of composition 10 will be thrown therefrom by centrifugal force and not by the bursting of the explosive 18, as commonly practiced. The pellets of composition are hurled from the rotating device when the rocket reaches its maximum height just previous to the ignition of the explosive material 18, which is adapted to completely shatter the rocket.

Each of the chambers 1 and 2 is provided with an opening 21, on opposite sides thereof, and at a pre-determined distance from the outer ends for the escape of gases as the meal powder is burned, whereby the rocket functions to rotate immediately before and during its upward flight and previous to the ignition of the explosive material 18. At pre-determined points along the bottom of the chambers 1 and 2 are located openings 22, which function to allow the escape of gases from the burning composition 17, causing the revolving rocket to be forced upward.

A quick match 19, having an ignition end 20, is suitably located in connection with the containers approximately as disclosed in the figures of drawing. Portions of the match 19 are extended into the openings 21 and 22 for operative contact with the slow burning meal powder. Auxiliary quick matches 23 and 24 are located in such a manner that one of the ends will extend into the slow burning meal powder at a predetermined point, approximately as disclosed in Figure 1, and arranged so that the ignited fuse or quick members 23 and 24 will reach the balancing chambers 9 and 9' when the rocket reaches its maximum height and an instant later the combustion or slow burning meal powder will reach the explosive material 18, thereby destroying the rocket.

Figure 2:
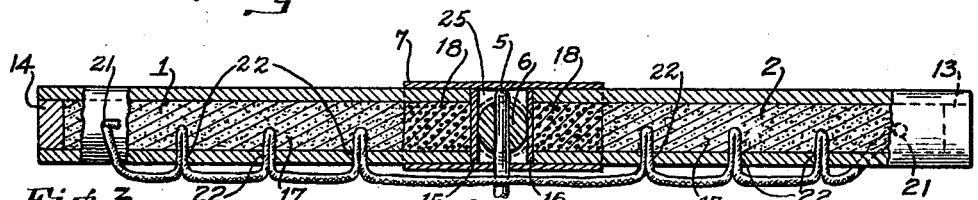
Fig. 2 represents a sectional view of Figure 1 taken along line 2—2.
Figure 3:
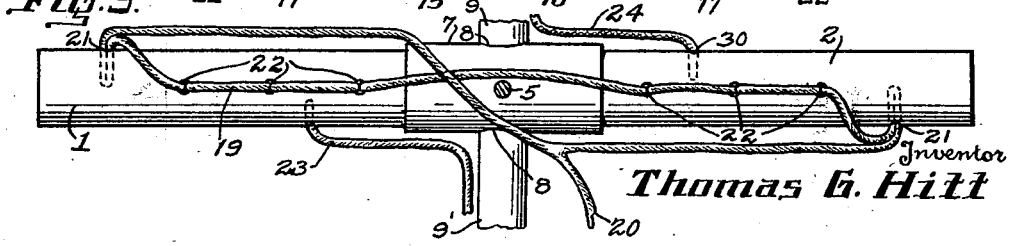
Fig. 3 illustrates a bottom plan view of the rocket, with the pellet display chambers broken away.

The bearing for the pivot member 5 may be of any desirable type, preferably as indicated in Figure 2, wherein the bearing is formed merely by drilling a hole through the member 6, and for receiving in loose relationship therein the pivot 5, the free end of the pivot being allowed to bear against the sleeve portion 7.

The member 6, normally, is partly surrounded by an air space 25. The chambers used in this rocket are preferred to be rigidly fastened to the hub portions by means of glue, the lifting members being glued into the sockets, and the balancing members securely glued over the projecting dowell member 6.

The disk members 15 and 6 and 26 and 27 may be made of cardboard or other suitable material. The disk 26 is forced out of its tube by the pressure of burning gases from the combustibles within the tube, which allows the pellets 10 to be thrown out by centrifugal force. On the ignition of the quick match 19 at the point 20, the combustion will spread instantly to all of the openings except 29 and 30, which do not fire their fuses until the combustion reaches them through the meal powder composition 17. The location of the openings 29 and 30 has been pre-determined so that the combustion will reach the balancing members through the fuses 23 and 24 at the point of highest rise of the rocket, and an instant later the combustion of the slow burning meal powder 17 will reach the explosive material 18.

In general, this rocket is simple of construction and inexpensive to manufacture. It comprises a minimum number of parts such as lifting members and balancing elements all in the same plane, the slow burning meal powder and destroying explosive are rammed solidly in the contaners thereby forming a compact mass in which premature mixing will not take place and wherein partitions are not required.

It is to be understood that alterations and substitutions may be made in the above disclosure both in the specification and drawings within the scope of the appended claim without affecting the merits of this invention.

What I claim is:

A rotary rocket having lifting and balancing members, a slow burning material and an explosive substance adjacently arranged within the lifting members, pyrotechnic display elements detachably positioned within the balancing members, at the ends thereof and adapted to be hurled from the balancing members by means of centrifugal force, a quick match suitably arranged in relationship with the lifting and balancing members for igniting the slow burning material, openings in the sides of the lifting members for allowing gases to escape therefrom, thereby causing the rocket to rotate, and a plurality of openings in the bottom of the lifting members for allowing the escape of gases, thereby causing the rocket to rise.

In testimony whereof I affix my signature.

THOMAS G. HITT.